United States Patent [19]

Nagai

[11] 4,418,808
[45] Dec. 6, 1983

[54] CENTRIFUGAL CLUTCH BRAKE ARRANGEMENT FOR FARM WORK MACHINERY OR OTHER APPARATUS

[75] Inventor: Shigeo Nagai, Sanada, Japan

[73] Assignee: Nisshin Kogyo Kabushiki Kaisha, Nagano, Japan

[21] Appl. No.: 265,808

[22] Filed: May 20, 1981

[30] Foreign Application Priority Data

| May 21, 1980 | [JP] | Japan | 55-67561 |
| May 22, 1980 | [JP] | Japan | 55-70691[U] |
| May 29, 1980 | [JP] | Japan | 55-71766 |
| May 29, 1980 | [JP] | Japan | 55-74108[U] |
| May 29, 1980 | [JP] | Japan | 55-74109[U] |

[51] Int. Cl.³ .................................................. B60K 41/24
[52] U.S. Cl. .................................................. 192/18 R
[58] Field of Search ............... 192/17 R, 18 R, 15, 192/12 R; 56/11.3, 11.7, 11.8

[56] References Cited

U.S. PATENT DOCUMENTS

4,226,313 10/1980 Meldahl et al. ................ 56/11.3 X
4,286,701 9/1981 MacDonald ................ 192/18 R X
4,316,355 2/1982 Hoff .................................. 56/11.3

Primary Examiner—George H. Krizmanich
Attorney, Agent, or Firm—Cantor and Lessler

[57] ABSTRACT

A centrifugal clutch brake for farm work machinery or other apparatus is provided comprising a member attached rotatably to an output shaft extending from a member fixed to an engine mounting, a clutch plate disposed between a drum rotatably together with said output shaft and the fixed member, a disc plate mounted on the clutch plate in face-to-face relation to the fixed member, a brake plate disposed between the disc plate and the clutch plate toward the fixed plate, a clutch spring provided for biasing the clutch plate toward the drum, and a fly-weight mounted on the clutch plate. The fly-weight is adapted to be expanded by a centrifugal force until it is placed in engagement with the drum. With such an arrangement, when a push is given to the brake plate against the pressure spring, the disc plate is spaced away from the fixed member with subsequent disengagement of the brake plate out of the disc plate, thereby urging the fly-weight upon the drum.

6 Claims, 6 Drawing Figures

CENTRIFUGAL CLUTCH BRAKE ARRANGEMENT FOR FARM WORK MACHINERY OR OTHER APPARATUS

BACKGROUND OF THE INVENTION

The present invention relates to a centrifugal clutch brake arrangement for farm work machinery or other apparatus.

For example, when a power-operated lawn mower is moved to cut the grass in varied places, it is required to stop the rotation of the cutting tool while keeping the engine at an idle to save the labor involved in re-actuation of the engine and for safety's sake.

A clutch brake using a friction belt and the like has heretofore been employed to form the above-mentioned operations. However, the clutch brake of this type has a complicated structure which inevitably renders the overall arrangement larger. In addition, an increased load is applied on the engine in converting it from an idle state to a state where engagement of the clutch takes place. Such an overload does not permit smooth engagement of the clutch, and is apt to cause an engine stop. Thus, it is still impossible to apply the clutch brake to an engine having a small capacity.

SUMMARY OF THE INVENTION

The present invention generally aims at providing a solution to the above-mentioned problems.

An object of the present invention is to provide a centrifugal clutch brake arrangement of small size and simple construction characterized in the following points. A brake plate which urges a disc plate upon a fixed member by a pressure spring is pushed against the pressure spring, so that the disc plate is spaced away from the fixed member by a clutch spring with subsequent disengagement of the brake plate out of the disc plate. At the same time, a fly-weight formed on the clutch plate takes abutment upon a drum turning together with an output shaft to cause rotation of the clutch plate, so that the fly-weight is expanded by a centrifugal force and urged upon the drum to cause rotation of a rotatable member. Upon removal of a push given to the brake plate, on the other hand, the pressure spring permits the brake plate to urge the disc plate upon the fixed member, thereby braking the rotatable member against rotation. With this arrangement, a load applied on an engine in converting it from an idle (braking) state to a state, where engagement of the clutch takes place, can be reduced as much as possible, thus assuring smooth engagement of the clutch with no danger of an engine stop and permitting the rotation of the rotatable member to come to a sure halt by removal of a pushing force applied on an operative rod. Accordingly, disengagement of the clutch can be effected rapidly and surely.

Another object of the present invention is to provide a centrifugal clutch brake arrangement characterized in that, when a push is given to a brake plate, a clutch plate is placed in clutch engagement with a drum rotatable together with an output shaft of an engine; when the brake plate is restored to the original position, the clutch plate is urged upon a fixed member by the plate to brake a rotatable member against rotation for disengagement of the clutch; and a pair of guide pieces formed on the brake plate supportably inserted through the fixed member and a pressure spring is provided for biasing the brake plate toward the fixed member, so that a push is given to a pressure plate inserted through the output shaft and provided suspensorily between both guide pieces through an operative rod positioned at a right angle with the pressure plate. With this arrangement, a pushing force can be applied on the pressure plate from both sides around the output shaft, assuring smooth parallel movement of the brake plate. Consequently, a load applied by the engine converts it from an idle (braking) state to a state, where engagement of the clutch occurs, assuring smooth engagement of the clutch with no possibility of an engine stop. Moreover, since the brake plate is restored to the original position by removal of a pushing force applied on an operative rod, the rotatable member can rapidly and surely be braked against rotation.

A further object of the present invention is to provide a centrigugal clutch brake arrangement for farm work machinery or other apparatus characterized in that a fly-weight adapted to be expanded by a centrifugal force and placed in engagement with a drum is provided on a clutch plate interposed between a fixed member and the drum, and a clutch spring is provided for constantly biasing the clutch plate toward the drum so that, during engagement of the clutch, the fly-weight is urged upon the drum under a constant preload. With this arrangement, the conversion of an engine from an idle (braking) state to a clutch engagement state can rapidly and surely be effected without an engine stop so that the engine can make a good start with immediate full-rotation of the rotating member.

A still further object of the present invention is to provide a centrifugal clutch brake arrangement of simple construction and small size characterized in that a fly-weight in arcuate form is rotatably attached to the bottom of a clutch plate by a support pin, and is fixedly provided with a lining on its surface confronting the inner bottom and wall of a drum. With this arrangement, a load applied on an engine in converting it from an idle (braking) state to a clutch engagement state can be reduced as much as possible, assuring smooth engagement of the clutch without no fear of an engine stop. In addition, disengagement of the clutch can rapidly and surely be effected by applying brakes to the rotatable member.

A still further object of the present invention is to provide a centrifugal clutch brake arrangement for farm work machinery or other apparatus characterized in the following points. When a push is given to a brake plate, a clutch plate is placed in clutch engagement with a drum rotatable with an output shaft of an engine to cause turning of a rotatable member. On the other hand, when the brake plate is restored to the original position, the clutch plate is urged upon a fixed member by the brake plate to apply brakes to the rotatable member for disengagement of the clutch. A guide member is fitted into a projecting piece formed on the peripheral edge of the clutch plate and bent in the direction of the output shaft, said projecting piece being provided at its end with a means for locking the guide member against disengagement. The guide member is placed in slidable engagement with the rotatable member in the direction of the output shaft in a projection/recession fitting manner, so that the clutch plate is rotatable with the rotatable member. With this arrangement, there is no collisional contact between the clutch plate and the rotatable member in engagement of the clutch, since they are engaged with each other in a projection/recession fitting manner. Therefore, the rotatable member suffers no damage, and little or no collisional noise is generated. In addition, disengagement of the guide member due to movement of the clutch plate is eliminated, and replacement of the guide member is easily effected.

BRIEF DESCRIPTION OF THE DRAWINGS

These and other objects of the present invention will become apparent from a reading of the following detailed description with reference to the accompanying drawing together one embodiment of the present invention applied to a power mower, in which.

A member 1 includes a flange 1a fixed to the underside of an engine mounting 3 by means of clamp bolts (not shown) passing through a plurality of holes 2 formed therein. An output shaft 4 leading to a crank shaft (not illustrated) extends downwardly from the middle portion of the fixed member 1.

A collar member 5 comprises a first cylinder 5a having a longer length, a flange 5b and a second cylinder 5c having a shorter length and a smaller diameter, and a double-split key groove 6 is formed extending from the first cylinder 5a to the flange 5b. A drum 7 is fixed in place by a rivet 9 in such a manner that the flange 5b of collar 5 is sandwiched between the inner edge thereof and a flange of a cylindrical key stopper 8 fitted into the first cylinder 5a. The first cylinder 5a of collar 5 is fitted to the output shaft 4 with a semi-circular key 10 engaging one of the key splits 6, so that the drum 7 is rotatable together with the output shaft 4.

A cylindrical adjusting bolt 11 has an its shank an externally threaded portion 11a, and is threadedly connected to an internally threaded portion 5d formed on a bore in the second cylinder 5c with its upper end abutting upon the head of shaft 4. The amount of collar 5 to be fitted to shaft 4 is determined by turning of the adjusting bolt 11 with the use of a tool that is fitted into a groove 11b formed in the head thereof.

A bearing 12 is fitted over the second cylinder 5c, and has a washer 13 placed on its lower end face. A bolt 14 is passed through through adjusting bolt 11 via a spring washer 15, and is threaded into a threaded hole 4a in the shaft 4 to prevent downward disengagement of collar 5 and bearing 12. An amount of engine oil leaking from an engine and flowing down on the output shaft 4 is discharged downwardly from an oil discharge part 16 provided in the drum 7 through a key split 6, now serving as a discharge passage, situated on the side that is not in engagement with the semi-circular key 10 and a discharge passage in the flange 5b of collar 5, both passages being in communication with each other.

A member 17 is rotatably attached to the output shaft 4 through bearing 12, and has a working cutter 18 mounted on the outer surface of its bottom through a seat plate 17a by means of a bolt 19 and a nut 20. A clutch plate 21 is interposed between the drum 7 and the fixed member 1. A disc plate 22 having annular linings 23a, 23b is bodily fixed to the clutch plate 21 by a bolt 24 and a nut 25 in face-to-face relation to the fixed member 1.

A brake plate 26 is interposed between the clutch plate 21 and the disc plate 22, and is provided on its outside with two pairs of support pieces 27 which are opposite to each other while being folded upwardly. Each piece 27 projects over the fixed member extending through an associated bore 28 formed therein, and is fixedly fitted with a spring retainer 29.

Each piece 27 is further inserted into a pressure spring 30 interposed biasedly between the upper face of member 1 and the spring retainer 29, which produces a spring force enough to urge the brake plate 26 toward the fixed member 1, so that the lining 23a of plate 22 is always urged upon the lower face of member 1. A guide piece 31 is formed by folding upwardly a portion of the outside of the brake plate 26 at an intermediate portion between a pair of support pieces 27 in the same manner as in piece 27. The guide piece 31 projects over the fixed member 1, extending through a guide bore 32 formed therein, and comes in slidable contact with the side wall of bore 32 on both sides. A pressure plate 33 has its middle portion inserted into the output shaft 4, and both ends 33a thereof are folded downwardly in such a manner that they cover the outside of piece 31 from the upper portion of the end. The end of plate 33 is screwed to the guide piece 31 by a bolt 34.

An operation rod 35 is, mounted on a bracket 36 secured to the fixed member 1, and is pivotable on a pin 37 serving as a pivot point. The rod 35 is attached at a right angle with respect to the pressure plate 33 with its left-hand operable end 35a being bifurcated so as to surround the output shaft 4. The end 35a is provided on its lower portion with a projection 35b in such a manner that it abuts against the upper face of plate 33 on a line $L_2$ extending through the central point of shaft 4 at right angles with a line $L_1$ connecting the central point of shaft 4 to the pivotal center point of rod 35. An arm 35c of rod 35 projects from a window 38 provided in the side wall of the fixed member 1. Upon giving a pull to a cable (not shown) leading to a clutch lever coupled to this arm 35c, the projection 35b of end 35a gives a downward push to the pressure plate 33, resulting in downward and parallel movement of the brake plate 26.

Three outwardly extending projections 39 are provided on the peripheral edge of clutch plate 21 at regular intervals, and are folded downwardly so that they are positioned substantially in parallel with the axial direction of shaft 4. Guide members 40 formed of, e.g., a glass fiber-filled resin material, are inserted into these projections. To prevent disengagement of guide members 40, tools or the like are inserted into cut-outs 41 provided in the ends of projections 39 for outward enlargement thereof. Removed of guide members 40 are attained by giving an inward press to the thus enlarged ends of projections 29. This makes replacement of guide members 40 easy.

The recessions 42 are provided in the side wall of the rotatable member 17 at regular intervals in correspondence to the projections 29 of the clutch plate 21. The projection 39 is inserted into the associated recession 42 in such a manner that it abuts upon one or both insides thereof for vertically slidable movement, with a clearance set between the inner wall of recession 42 and the outer end of member 40. Consequently, the member 17 is rotatable together with the clutch plate 21, so that even when the member 17 vibrates vertically during its rotation, the vibrations thereof are not transmitted to the clutch plate 21. This is because a clearance is present between the outer end of the guide member 40 and the inner wall of the recession 42. When the guide member 40 is then formed of hard resin, hard rubber and the like material, its abutment upon the rotating member 17 is further improved.

A clutch spring 43 has one end anchored in a small slot 44a in each of support portions 44 which extend outwardly and are provided on three equidistant positions of the periphery of the clutch plate 21 and the other end anchored in a small slot 46a in each of bent pieces 46 of recessions 45 formed by outward extension of the periphery of the rotating member 17 in correspondence to the respective support portions 44.

A spring force exerted by the clutch spring 43 always gives a pull to the clutch plate 21, so that the plate 21 is biased toward the drum 7 under a given preload.

Fly-weights 47 in arcuate form are provided in one end with a hole 47a through which is passed a support pin 48 secured to the clutch plate 21. To prevent disengagement of pin 48, a snap ring 49 is provided at the end thereof. The fly-weights 47 are mounted on the bottom of plate 21 in face-to-face relation to each other, and are rotatable around the support pins 48. Each fly-weight 47 is applied over its underside and outside with a lining 50. The underside 50a of lining 50 confronts the inner bottom 7a of drum 7, while the outside 50b thereof does the inner side wall 7b of drum 7. When the clutch plate 21 is moved toward the drum 7 until the underside 50a of lining 50 takes abutment on the inner bottom of drum 7, the clutch plate 21 begins to rotate and produces a centrifugal force which allows the fly-weights to be rotated while being expanded outwardly, whereby the outsides 50b of linings 50 are urged upon the inner wall 7b of drum 7.

Figure 6:
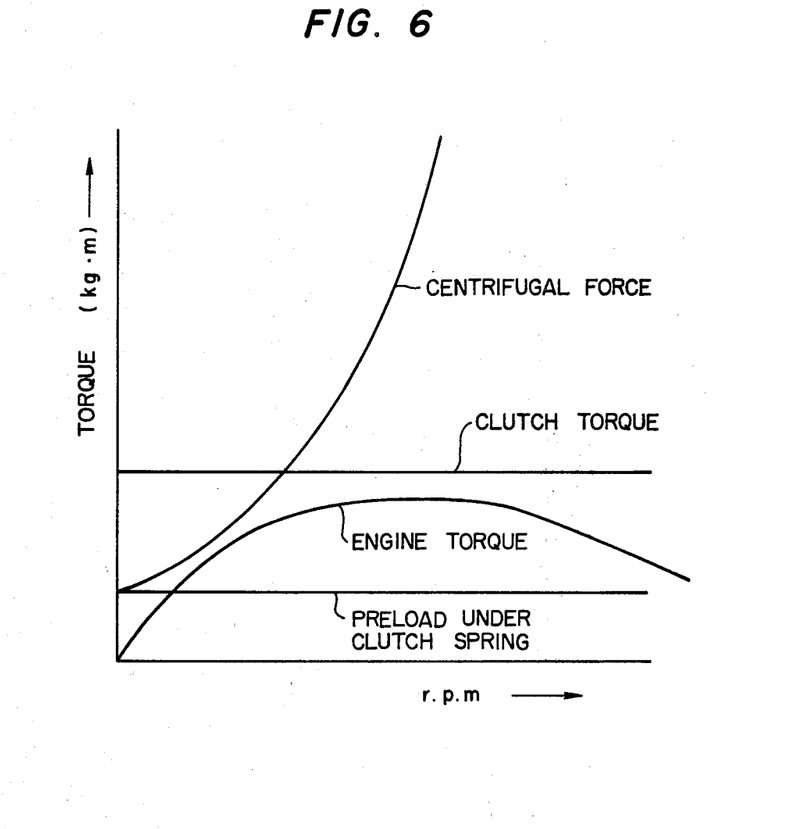
FIG. 6 is a graphical view showing the relationship between the revolutions per minute and the torque.

As shown in FIG. 6, the constant preload produced by the clutch spring 43 shall be in a range within which a curve of centrifugal force drawn with increases in the revolutions per minute is smaller than a clutch torque, and does not intersect a torque curve of an associated engine.

It will be understood that biasing the clutch plate 21 toward the drum 7 may be attained by forming an inwardly projecting receiving portion on the upper edge of an opening in the rotating member 17 and biasedly disposing a clutch spring between such a portion and the clutch plate 21.

A sight window 51 is provided in the side wall of the rotating member 17 so as to observe with the naked eye a gap between the undersides 50a of linings 50 and the inner bottom 7a of drum 7 via a through-window 52. This assures smooth adjustment of a clutch gap and easy outside investigation of wearing losses of linings 50.

A discharge hole 53 is provided through the bottom of the rotating member 17 so as to discharge to the outside water, engine oil and the like that enter the member 17 and are collected in it by a centrifugal force resulting from the rotation thereof. A water discharge hole 54 is also formed in the fixed member 1.

Figure 1:
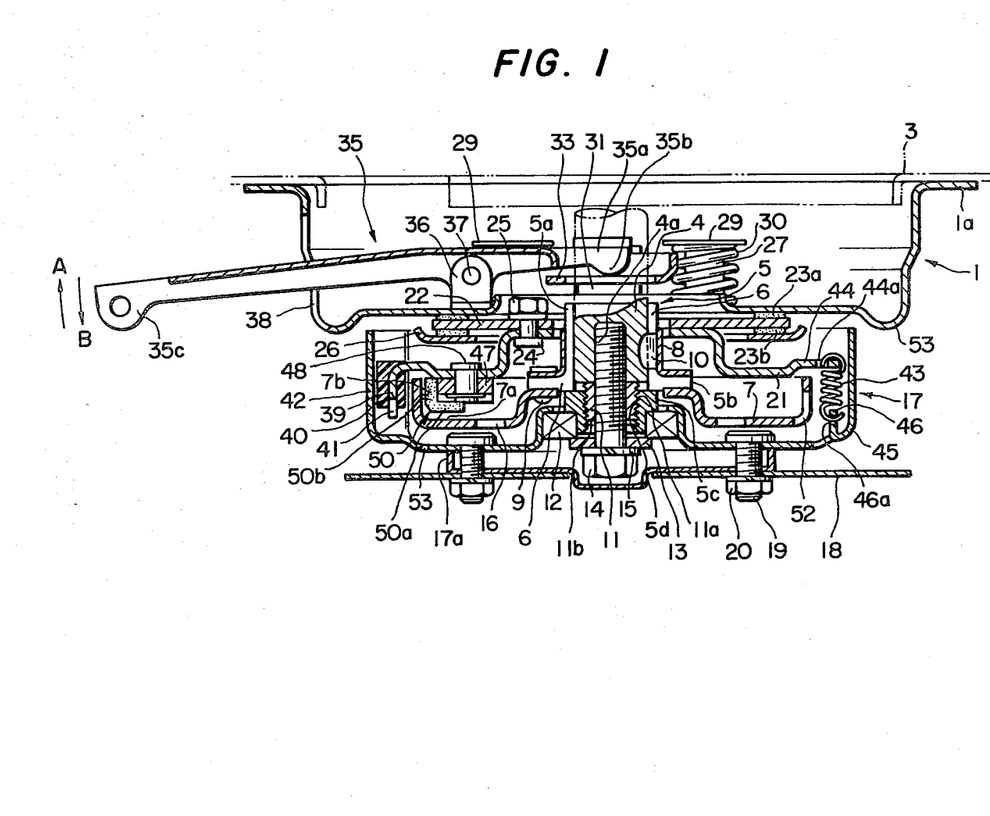
FIG. 1 is a sectioned front view.
Figure 2:
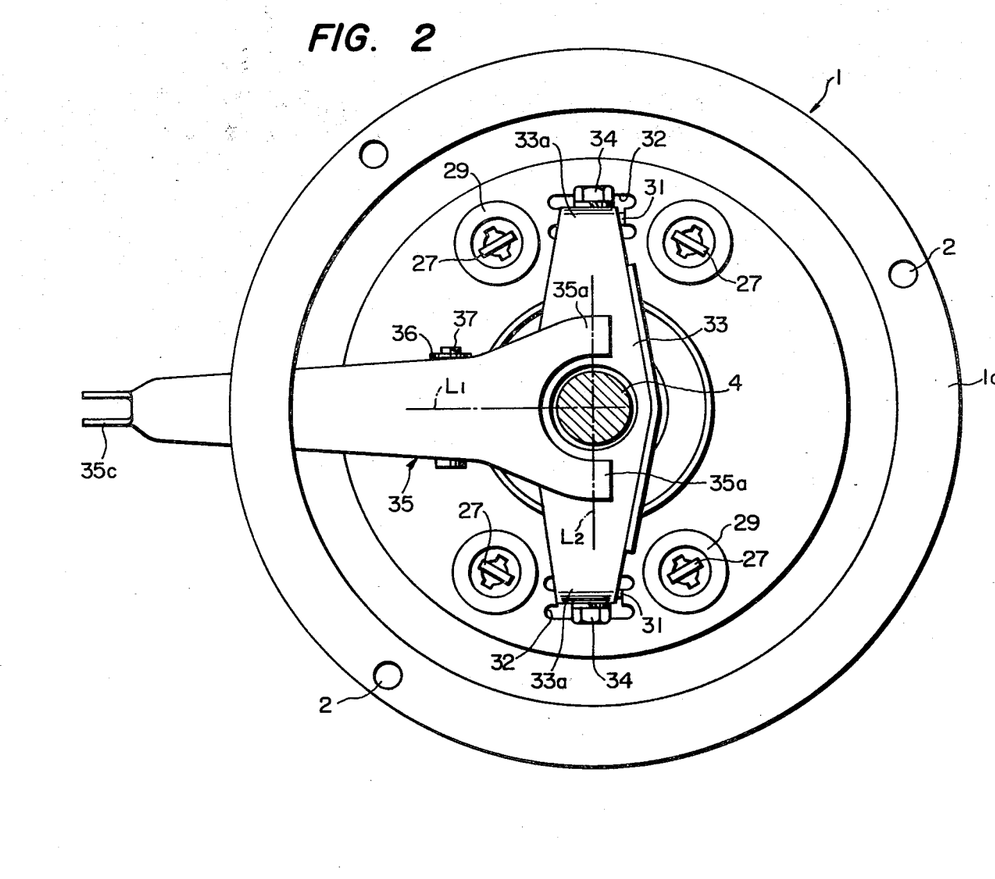
FIG. 2 is a plan view.
Figure 3:
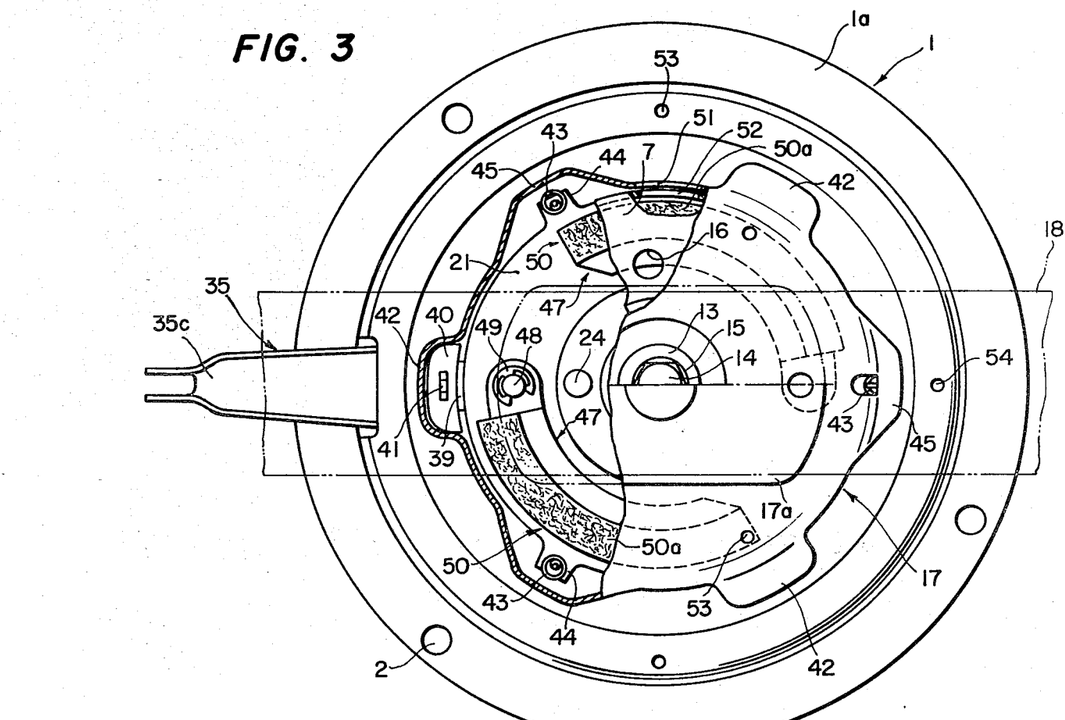
FIG. 3 is a partially cut-away bottom view.

An explanation of the operation of the foregoing embodiment will follow. In a braking state wherein the pressure spring 30 is stretched as shown in FIG. 1, the brake plate 26 is pulled up by this spring 30, so that the lining 23a of the disc plate 22 is forcedly urged upon the undersurface of the bottom of the fixed member 1. On the other hand, the clutch plate 22 fixed integrally to the plate 22 is also pulled up so that the clutch spring 43 is stretched. In this state, the linings 50 of fly-weights 47 are spaced away from the inner surface of drum 7. Accordingly, even though the engine is at work, the output shaft 4 and the drum 7 run idle with no transmission of any rotational force to the rotating member 17, so that the engine is kept idle while a cutting edge 18 is kept stationary.

Figures 4, 5:
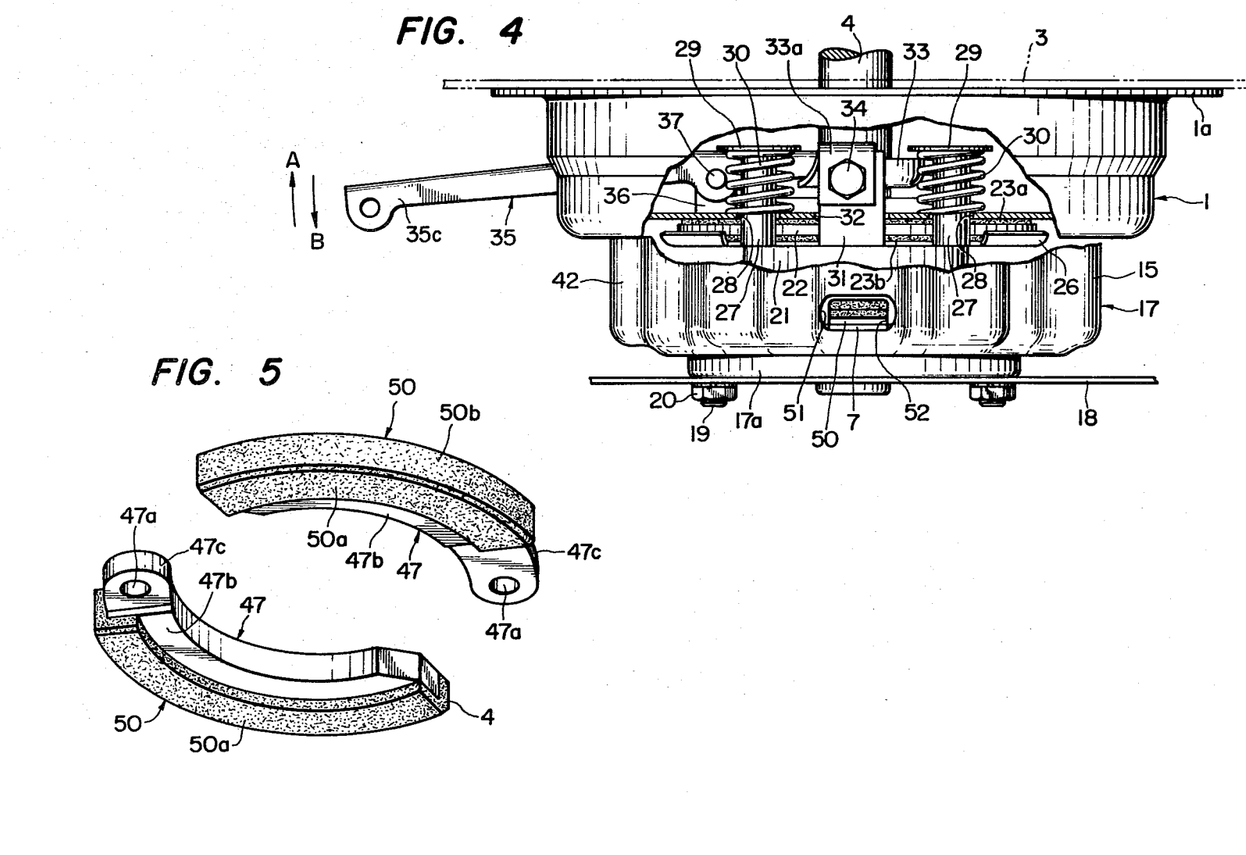
FIG. 4 is a front view partially cutaway and partially in cross section.
FIG. 5 is a perspective view of a fly-weight applied fixedly with a lining.

To rotate the cutting edge 18, a pull is given to a cable (not shown) connected to the arm 35c of the operating rod 35 to rotate the cutting edge 18 in the direction indicated by an arrow A in FIGS. 1 and 4. The projection 35b formed on the operative portion 35a of rod 35 then gives a downward push to the pressure plate 33, so that the brake plate 26 is forced down. Successive contraction of the pressure spring 30 causes the brake plate 26 to be guided by the guide piece 31 for downward parallel movement with attendant contraction of the clutch spring 43. This causes the clutch plate 21 to be pulled down, whereby the disc plate 22 is downwardly moved following the clutch plate 21 as an integral piece while its lining 23b remains engaged with the brake plate 26. Subsequently, the lining 23a of plate 22 is first spaced away from the undersurface of the bottom of member 1, and the undersides 50a of linings 50 of the fly-weights 47 attached to plate 21 take abutment upon the inner bottom 7a of drum 7 which is now rotated together with the output shaft 4. At the same time, the brake plate 26 is spaced away from the lining 23b of plate 22 until disengagement of plate 22 out of plate 26 takes place. When the undersides 50a of linings 50 applied over the fly-weights 47 come in abutting contact with the inner bottom 7a of drum 7, the clutch plate 21 starts to rotate while sliding following the rotation of drum 7, so that it is put in a so-called semi-clutch state. Since the clutch plate 21 now disengages from the brake plate 26 and the clutch spring 43 permits the undersides 50a of linings 50 to be lightly urged upon the inner bottom of drum 7, it starts to rotate smoothly, resulting in reductions in the load applied on the output shaft 4 which effects rotation of drum 7.

Thereupon, there in a rapid increase in the rotational force of the clutch plate 21 due to the constant preload applied in the direction for clutch engagement by the clutch spring 43. The fly-weights 47 are then rotated around the pins 48, while they are expanded outwardly due to a resulting centrifugal force, whereby the sides 50a of linings 50 are urged upon the inner wall of drum 7 to produce a clutch force. This clutch force permits the plate 21 to start rotating together with the drum 7 for clutch engagement. The power of shaft 4 is transmitted to the rotating member 17 via member 5, drum 7, plate 21, projection 39 and member 40 with attendant rotation of the cutting edge 18.

Upon removal of a pushing force applied on the cable, the pressure spring 30 is stretched so that the brake plate 26 is pulled up. The operative rod 35 is rotated in the direction indicated by arrow B in FIGS. 1 and 4 through the pressure plate 33, and the brake plate takes abutment upon the lining 23b of plate 22 which is rotating, whereby the disc plate 22 is pulled up. Subsequently, the clutch plate 21 is pulled up against the clutch spring 43 so that the guide member 40 slides up in the recession 42 with attendant disengagement of the underside 50a of lining 50 of the fly-weight 47 out of the inner bottom 7a of drum 7. When the lining 23a of plate 22 is urged upon the underside of the fixed member 1 by the brake plate 26, the disc plate 22 and have the clutch plate 21 and the rotating member 17 are braked against rotation, whereby disengagement of the side 50b of lining 50 out of the inner side wall 7b of drum 7 takes place. As a result, the rotation of cutter 18 stops while the drum 7 remains rotated.

It will be understood that, in the foregoing member, the rotatable member may fixedly be provided with other tools in addition to cutter 18, and may be employed as a pulley or the like. Thus, the present invention can be applied to various farm work machines.

As mentioned above, the clutch plate placed in a braking state is urged upon the drum which is rotating together with the output shaft under a constant preload exerted by the clutch spring in the clutch direction according to the present invention. At the same time, disengagement of the disc plate integral with the clutch plate out of the brake plate takes place so that the rotational force of the drum is transmitted to the clutch plate via the fly-weight. The fly-weight is subsequently urged upon the drum by a centrifugal force resulting from the rotation of the clutch plate. Accordingly, a load applied on the engine in clutch engagement can be reduced as much as possible. In addition, since no braking load is applied on the engine, smooth engagement of the clutch is assured. With this arrangement, it is possible to use an engine having a small capacity with no fear of an engine stop and permit the engine to make a good start. The power of the engine can thus be rapidly and surely transmitted to the rotatable member.

Furthermore, the removal of a pushing force applied on the operative rod automatically cause the brake plate to urge the disc plate upon the fixed member through the pressure spring. Immediately thereupon, the rotation of the clutch plate and the rotatable member comes to a halt. Accordingly, it is possible to surely effect disengagement of the clutch with speed and in safety.

A pair of guide pieces formed on the brake plate are supportably inserted through the fixed member, and the brake plate is biased toward the fixed member by the pressure spring. The brake plate is then inserted into the output shaft to cause the pressure plate positioned suspensorily between both pieces to be pushed around the output shaft from both sides by the operative rod placed at a right angle with the pressure plate, so that the brake plate is movable in the direction of the brake plate. As a result, parallel movement of the brake plate in the direction of the output shaft is assured with sure engagement of the clutch. A load applied on the engine during clutch engagement can be reduced as much as possible, with the result that the occurrence of an engine stop can effectively be prevented. In addition, the removal of a pushing force applied on the rod causes the brake plate to urge the disc plate rotating together with the brake plate upon the fixed plate through the pressure spring for braking, whereby the rotation of the rotatable member can surer be brought to a halt in a rapider manner.

Still further, the clutch plate is always biased toward the drum by the clutch spring. Therefore, when the fly-weight is urged upon the drum under a constant preload in clutch engagement, the conversion of the engine from an idel (braking) state to a clutch engagement state can rapidly and surely be effected without an engine stop. In addition, the engine can make a good start so that full-rotation of the rotatable member is caused in a very short time.

When the fly-weight attached to the clutch plate is applied with a lining on its surface confronting the inner bottom and side wall of the drum, the underside of the lining takes abutment upon the inner bottom of the drum rotating together with the output shaft. The rotational force of the drum is transmitted to the clutch plate via the fly-weight in such a manner that it increases slowly from the initial small magnitude. The fly-weight is expanded by a centrifugal force resulting from the rotation of the clutch plate, so that the outer side of the lining thereof is urged upon the inner side wall of the drum for clutch engagement. Thus, a load applied on the engine during clutch engagement can be reduced as much as possible, assuring smooth engagement of the clutch. With this arrangement, it is possible to use an engine having a small capacity without an engine stop. The power of the engine can also be surely transmitted to the rotatable member.

Still further, the guide member is fitted into the projecting piece formed on the peripheral edge of the clutch plate and bent in the direction of the output shaft, and is engaged with the rotating member in a projection/recession fitting manner to prevent the clutch plate and the rotating member from coming in direct contact with each other in clutch engagement. Accordingly, it is feasible to effectively prevent damage of the rotatable member and reduce a collisional noise as much as possible. A load applied on the engine can also be reduced with no fear of an engine stop, assuring smooth and sure engagement of the clutch. The vibrations of the rotatable member caused by the guide member are not directly transmitted to the clutch plate, so that a load larger than necessary is not applied on the engine, assuring sure engagement of the clutch. In addition, since the guide member is simply and surely locked in the projecting piece, the guide member can slide in the recession in the rotatable member without failure. Replacement of the guide member is also easily effected.

What is claimed is:

1. A centrifugal clutch brake arrangement for farm work machinery or other apparatus comprising a member attached rotatably to an output shaft extending from a member fixed to an engine mounting, a drum fixed to said shaft for rotation therewith, a clutch plate disposed between said drum and said fixed member, a disc plate fixedly mounted on said clutch plate in face-to-face relation to said fixed member, a brake plate disposed between said disc plate and said clutch plate and engaging said disc plate, a pair of guide pieces formed on said brake plate, supportably inserted through said fixed member and terminating in a retainer, a pressure spring interposed between said fixed member and said retainer for biasing said brake plate toward said fixed member, a clutch spring interposed between said clutch plate and said first mentioned member for biasing said clutch plate toward said drum whereby the peripheral edge of said clutch plate is placed in slidable engagement with said drum in the direction of the output shaft of said rotatable member, said fixed member, drum, clutch plate, disc plate, brake plate, and shaft being coaxial, and an arcuate fly-weight pivotally mounted at one end thereof on said clutch plate such that the other end moves outwardly by centrifugal force until said fly-weight engages said drum, so that when a push is given to said brake plate against said pressure spring, said disc plate is caused to move away from said fixed member with subsequent disengagement of said brake plate out of said disc plate, thereby urging said fly-weight upon said drum.

2. A centrifugal clutch brake arrangement for farm work machinery or other apparatus comprising a member attached rotatably to an output shaft extending from a member fixed to an engine mounting, a drum fixed to said shaft for rotation therewith, a clutch plate disposed between said drum and said fixed member, a disc plate fixedly mounted on said clutch plate in face-to-face relation to said fixed member, a brake plate positioned between said disc plate and said clutch plate and engaging said disc plate, a pair of guide pieces formed on said brake plate, supportably inserted through said fixed member and terminating in a retainer, a pressure spring interposed between said fixed member and said retainer for biasing said brake plate toward said fixed member, a pressure plate inserted over said output shaft and disposed between both guide pieces, an operating rod pivotally mounted on a bracket which is fixed to said fixed member and positioned at a right angle to said pressure plate, said operating rod being adapted to bear against said pressure plate on both sides of said output shaft, a clutch spring interposed between said clutch plate and said first mentioned member for biasing said clutch plate toward said drum whereby the peripheral edge of said clutch plate is placed in slidable engagement with said drum in the direction of the output shaft of said rotatable member, said fixed member, drum, clutch plate, disc plate, brake plate, and shaft being coaxial, and an arcuate fly-weight pivotally mounted at one end thereof on said clutch plate such that the other end moves outwardly by centrifugal force until said fly-weight engages said drum, so that when a push is given to said brake plate gainst said pressure spring, said disc plate is caused to move away from said fixed member with subsequent disengagement out of said disc plate, thereby urging said fly-weight upon said drum.

3. A centrifugal clutch brake arrangement for farm work machinery or other apparatus comprising a member attached rotatably to an output shaft extending from a member fixed to an engine mounting, a drum fixed to said shaft for rotation therewith, a clutch plate disposed between said drum and said fixed member, a disc plate fixedly mounted on said clutch plate in face-to-face relation to said fixed member, a brake plate disposed between said disc plate and said clutch plate and engaging said disc plate, a pair of guide pieces formed on said brake plate, supportably inserted through said fixed member and terminating in a retainer, a pressure spring interposed between said fixed member and said retainer for biasing said brake plate toward said fixed member, a clutch spring interposed between said clutch plate and said first mentioned member for biasing said clutch plate toward said drum whereby the peripheral edge of said clutch plate is placed in slidable engagement with said drum in the direction of the output shaft of said rotatable member, said fixed member, drum, clutch plate, disc plate, brake plate, and shaft being coaxial, an arcuate fly-weight pivotally mounted at one end thereof on said clutch plate such that the other end moves outwardly by centrifugal force until said fly-weight engages said drum, and a clutch spring disposed between said clutch plate and said rotatable member for constantly biasing said clutch plate toward said drum and urging said fly-weight upon said drum during clutch engagement under a predetermined preload, so that when a push is given to said brake plate against said pressure spring, said disc plate is spaced away from said fixed member with subsequent disengagement of said brake plate out of said disc plate, thereby urging said fly-weight upon said drum.

4. A centrifugal clutch brake arrangement as recited in claim 3, in which said fly-weight is rotatably mounted on the bottom of said clutch plate by a support pin, and carries a lining on its surface confronting the inner bottom and side wall of said drum.

5. A centrifugal clutch brake arrangement for farm work machinery or other apparatus comprising a member attached rotatably to an output shaft extending from a member fixed to an engine mounting, a drum fixed to said shaft for rotation therewith, a clutch plate disposed between said drum and said fixed member, a projecting piece formed on the peripheral edge of said clutch plate and bent in the direction of said output shaft, a guide member carried by said projecting piece and projecting outwardly, said projecting piece being provided at its end with a means for locking said guide member against disengagement, said rotatable member having a recessed projecting portion formed on its peripheral edge and bent in the direction of said output shaft and aligned with said guide member, and said guide member being placed in slidable engagement with said rotatable member in the direction of said output shaft so that said clutch plate is rotatable together with said rotatable member, a disc plate fixedly mounted on said clutch plate in face-to-face relation to said fixed member, a brake plate disposed between said disc plate and said clutch plate and engaging said disc plate, a pair of guide pieces formed on said brake plate, supportably inserted through said fixed member and terminating in a retainer, a pressure spring interposed between said fixed member and said retainer for biasing said brake plate toward said fixed member, a clutch spring interposed between said clutch plate and said first mentioned member for biasing said clutch plate toward said drum, said fixed member, drum, clutch plate, disc plate, brake plate, and shaft being coaxial, and an arcuate fly-weight pivotally mounted at one end thereof on said clutch plate such that the other end moves outwardly by centrifugal force until said fly-weight engages with said drum, so that when a push is given to said brake plate against said pressure spring, said disc plate is spaced away from said fixed member with subsequent disengagement of said brake plate out of said disc plate, thereby urging said fly-weight upon said drum.

6. A centrifugal clutch brake arrangement as recited in claim 5, in which said locking means is a cut-out formed in the end of said projecting piece, said cut-out being enlarged outwardly.

* * * * *